(12) United States Patent  
Scheid

(10) Patent No.: US 6,659,538 B2  
(45) Date of Patent: Dec. 9, 2003

(54) HATCHBACK FOR AN AUTOMOBILE

(75) Inventor: Frank Scheid, Gros-Rederching (FR)

(73) Assignee: Wagon Automotive GmbH (DE)

( * ) Notice: Subject to any disclaimer, the term of this patent is extended or adjusted under 35 U.S.C. 154(b) by 0 days.

(21) Appl. No.: 10/234,583

(22) Filed: Sep. 4, 2002

(65) Prior Publication Data

US 2003/0047963 A1 Mar. 13, 2003

(30) Foreign Application Priority Data

Sep. 5, 2001 (DE) .......................................... 101 43 643

(51) Int. Cl.$^7$ ................................................. B60J 5/10
(52) U.S. Cl. .................. 296/146.8; 296/50; 296/56; 296/146.5; 296/146.11; 296/146.6; 49/502
(58) Field of Search ............... 296/50, 56, 106, 296/146.5, 146.6, 146.8, 146.9, 146.11; 49/502

(56) References Cited

U.S. PATENT DOCUMENTS

| | | | |
|---|---|---|---|
| 5,379,553 A | * | 1/1995 | Kimura et al. ................. 49/502 |
| 5,398,453 A | * | 3/1995 | Heim et al. .................... 49/502 |
| 6,000,747 A | | 12/1999 | Sehgal ..................... 296/146.8 |
| 6,015,182 A | * | 1/2000 | Weissert et al. .......... 296/146.8 |
| 6,053,562 A | * | 4/2000 | Bednarski ................. 296/146.5 |
| 6,086,139 A | * | 7/2000 | Heim et al. ............... 296/146.5 |
| 6,234,564 B1 | | 5/2001 | Kim ......................... 296/146.8 |
| 6,450,565 B2 | * | 9/2002 | Yamamoto ............... 296/146.5 |

FOREIGN PATENT DOCUMENTS

| | | |
|---|---|---|
| DE | 19938511 A1 | 2/2001 |
| JP | 11 115498 | 4/1999 |
| WO | WO98/09833 A1 | 3/1998 |

* cited by examiner

Primary Examiner—Stephen T. Gordon  
Assistant Examiner—Lori L. Coletta  
(74) Attorney, Agent, or Firm—Andrus, Sceales, Starke & Sawall, LLP

(57) ABSTRACT

A hatchback for an automobile has an essentially peripheral supporting frame (1) designed as a hollow metal section, with a windshield area and a wall area, with a connecting section (2) arranged transversely in the supporting frame (1) at the transition of the windshield area and wall area, with a windshield (3) mounted on the supporting frame (1) in the windshield area and with an outside door panel (4) mounted on the supporting frame (1) in the wall area, whereby hinge brackets (5) that are movable with the supporting frame (1) are mounted on the upper edge of the supporting frame (1) in the windshield area and are pivotably connectable by at least one hinge element (8) each to stationary hinge blocks (7) mounted on a stationary body part (6) when the automobile hatchback is installed.

21 Claims, 6 Drawing Sheets

HATCHBACK FOR AN AUTOMOBILE

CROSS REFERENCE TO RELATED APPLICATION

This application claims priority from German patent application No. DE10143643.2, filed Sep. 5, 2001, incorporated herein by reference.

BACKGROUND AND SUMMARY

This invention relates to a hatchback for an automobile having a supporting frame with a windshield area and a wall area, a windshield mounted on the supporting frame in the windshield area and an outside door panel mounted on the supporting frame in the wall area.

It has long been known that an automotive hatchback designed as a metal-plastic composite structure offers considerable advantages in comparison with a hatchback made entirely of plastic as well as a hatchback made entirely of metal. Thus, with the conventional hatchbacks, both variants are self-supporting structures in a stressed-skin construction which has a considerable weight, and a separate design is required for each individual case.

The known hatchback in a metal-plastic composite structure in question here (WO 98/09833 A1) is characterized by the use of a supporting frame made of an enclosed or open hollow metal section, the inside and outside skins of the hatchback being made of plastic or lightweight metal and mounted on this supporting frame. The windshield is glued to appropriate adhesive surfaces on the supporting frame in the windshield area and covers it, while projecting laterally. The same thing is also true of the outside door panel, which is made of plastic in the wall area.

In addition to the considerable advantage with regard to the weight of the hatchback known from the state of the art as described above, there are also other advantages. Assembly of the outside door panel is independent of its design. The add-on parts may be installed in conclusion because the outside door panel and then the windshield are attached to the supporting frame at the end. Tool and die costs are much lower than is the case with hatchbacks constructed in a stressed-skin construction. The choice of colors is largely flexible because the color is determined to a great extent by the outside door panel. The basic design may be always the same. Finally, it is advantageous that this hatchback can be installed separately on the body of the vehicle at the end.

One problem with the hatchback known from the state of the art, however, is that the outside door panel, like the windshield, must be glued to the supporting frame. This is a disadvantage in the event of damage to the hatchback. In addition, assembly involving gluing is a difficult manufacturing process in view of the small joint widths to be maintained with motor vehicles.

The basic concept of a hatchback described above has already been implemented and improved upon in an advantageous manner (DE 199 38 511 A1). With this hatchback, on which the present invention is based, the supporting frame is provided with an insertion channel that is open toward the outside in the wall area, while the outside door panel has an insertion flange projecting toward the inside with which it is inserted into the insertion channel. In the area of the connecting section, there is a corresponding insertion channel, so that on the whole the outside door panel can be placed on the wall area of the supporting frame.

So far only one automotive hatchback having a stationary windshield has been explained. However, there are also known automotive hatchbacks having a windshield but can itself be lifted separately. This liftable windshield is then secured on the connecting section by means of a fastening element. It can be lifted as needed, i.e., swivelled upward.

Automotive hatchbacks having windshields which can themselves be lifted up are known from the state of the art only in a stressed-skin construction. When the mounting of a liftable windshield which is implemented in a stressed-skin construction is applied to the concept of the supporting frame hatchback (DE 199 38 511 A1), it is necessary to depart from the windshield extending over the supporting frame at the upper edge because the hinges which connect the windshield pivotably are mounted on the supporting frame there. This yields a sealing problem at the upper edge of the windshield and has a negative effect on the field of vision. In fact, only the stressed-skin construction is usually implemented in the case of a hatchback having a windshield which can be opened separately.

The teaching of this invention is based on the problem of providing an automotive hatchback designed according to the lightweight construction principle known from the state of the art with a supporting frame such that this hatchback is equally suitable for use with a stationary windshield and with an openable windshield and has a basic design which is universally suitable for both variants as closely as possible.

The problem presented above is solved by the automotive hatchback according to this invention. According to this invention, it is possible to implement an automotive hatchback which may be equipped with a stationary windshield or with a windshield that can itself be opened up independently. For both variants, the basic design of the hatchback is practically the same, and approximately 90% of the parts of the hatchback are the same for both variants. The basic idea of this invention is that the movable hinge parts of the openable windshield are also mounted by means of the hinge elements on the stationary hinge blocks on which the hatchback is pivotably mounted as a whole. Thus, the hatchback and the openable windshield have one and the same axis of rotation, and this makes it possible for the windshield to completely extend over the full area of the supporting frame even when the windshield is itself openable. No sealing problems occur at the upper edge of the supporting frame. The field of vision of the hatchback in the windshield area is not smaller for a hatchback having an openable windshield than for a hatchback having a stationary windshield.

According to a particularly preferred teaching, the supporting frame is prepared for universal applicability with a stationary or openable windshield due to the fact that the metal section forming the supporting frame has a fastening flange for a windshield gasket for an openable windshield in the area of the windshield and has an adhesive surface for a stationary windshield on the outside.

Furthermore, an especially important embodiment is characterized in that the hinge brackets together with the mounting area for the respective hinge element project upward above the upper edge of the supporting frame. Due to the hinge brackets arranged in this way, the mounting areas of the hinge elements are located above the top edge of the supporting frame and can easily be reached by the movable hinge parts of the windshield which extends beyond or can extend beyond the supporting frame toward the top.

It has already been explained in the state of the art (DE 199 38 511 A1) which forms the starting point that the hinges of the supporting frame are normally mounted on the upper transverse section which may also be reinforced to this end. An alternative has already been proposed inasmuch as the supporting frame is designed with a curved shape at the upper corners, and the hinge brackets are mounted on the supporting frame in the upper lateral areas and with the mounting area for the respective hinge element are in the free zones outside the supporting frame. This variant may also be used expediently with the hatchback according to this invention because then one also has the area here where the movable hinge parts of the windshield may act on the hinge elements when using an openable windshield.

The design of the hatchback according to this invention having a spoiler situated on the upper edge of the supporting frame is particularly important. Such a spoiler is provided in the state of the art (DE 199 38 511 A1) and is mounted completely on the stationary windshield. In the present case, it is advisable for the spoiler to be mounted (preferably only) on the hinge brackets in the case of a stationary windshield, and in the case of the openable windshield to be mounted (preferably only) on the movable hinge parts. As a rule, the spoiler will have an understructure which allows this mounting by welding or preferably by screw connection.

The independent teaching of this invention concerns a hatchback of the design whose fundamentals have already been described and is characterized in that an adapter part which projects at the side is mounted on the supporting frame in the wall area in particular by welding and/or screwing it onto the supporting frame, the adapter part forming a projecting edge for flanging the edge of the outside door panel. This tends to create more of a traditional option for mounting an outside door panel designed as sheet metal, in particular as a sheet of lightweight metal, without having to design any particular profiling in the metal section of the supporting frame. This is expedient in particular when the metal section of the supporting frame is made of steel.

DETAILED DESRCIPTION

Figure 1:
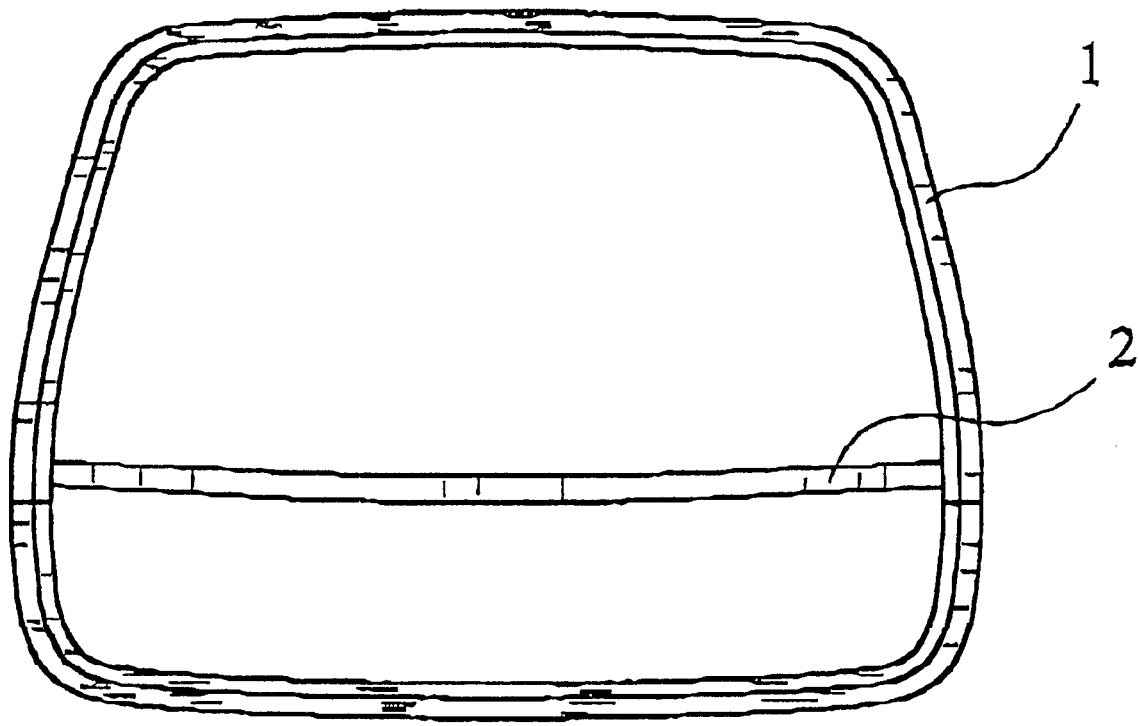
FIG. 1 shows a supporting frame of an automotive hatchback according to this invention in a view from the outside.

The object of this invention is a lightweight automotive hatchback with a supporting frame. This hatchback first has a supporting frame 1, which is designed as a metal section, in particular a hollow metal section running essentially peripherally. FIG. 1 shows this supporting frame 1.

FIG. 1 shows clearly that supporting frame 1 has an upper windshield area and a lower wall area. At the transition from the windshield area and wall area, a connecting section 2, also designed as a metal section, in particular a hollow metal section, is arranged transversely in supporting frame 1.

Figure 2:
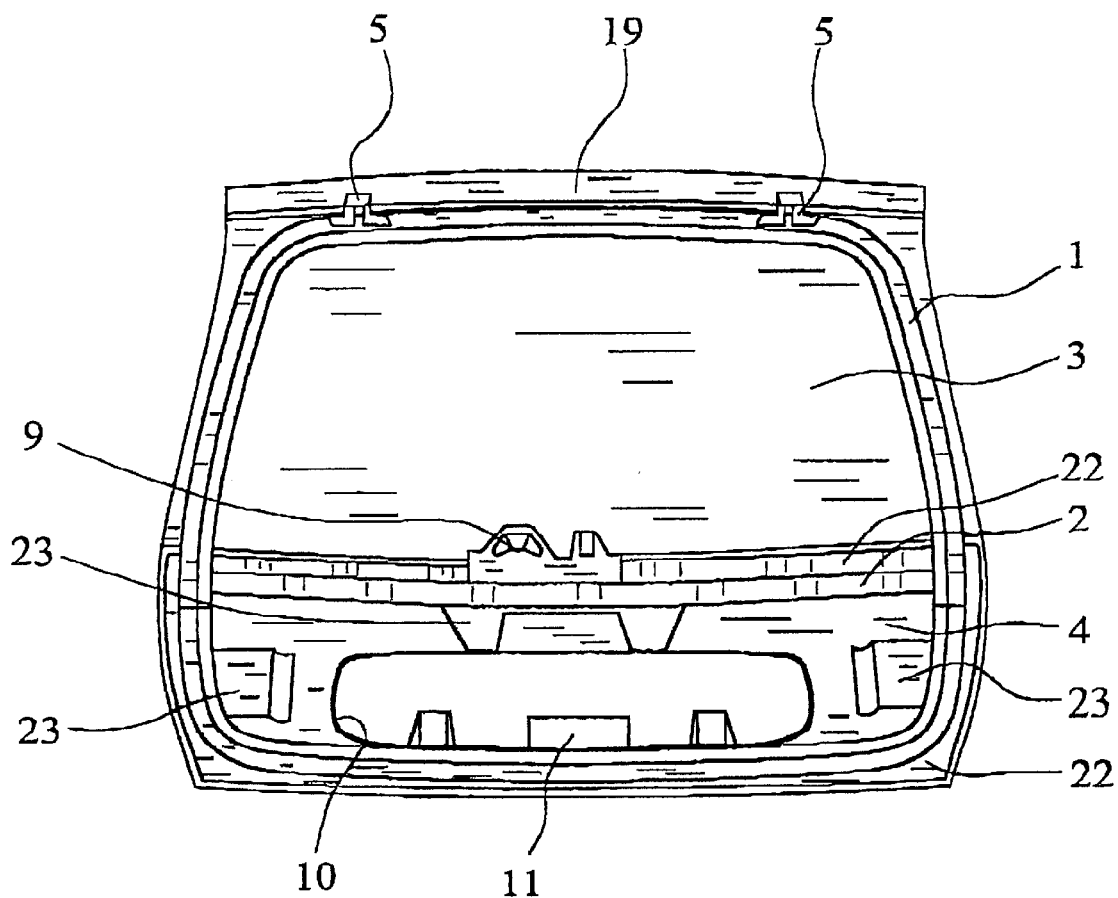
FIG. 2 shows the supporting frame from FIG. 1, now seen from the inside, with the add-on parts already attached from the outside.
Figure 4:
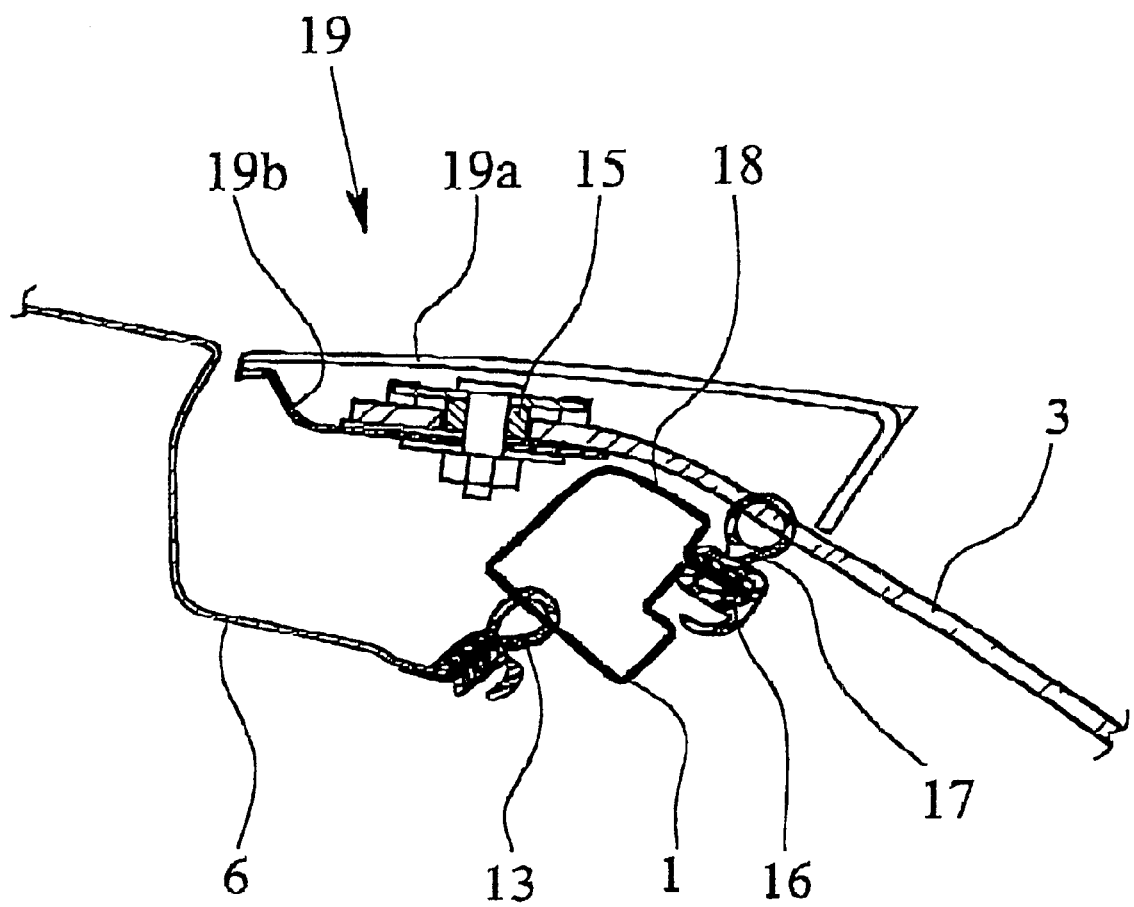
FIG. 4 shows a section in the area of the windshield support from FIG. 3.
Figure 5:
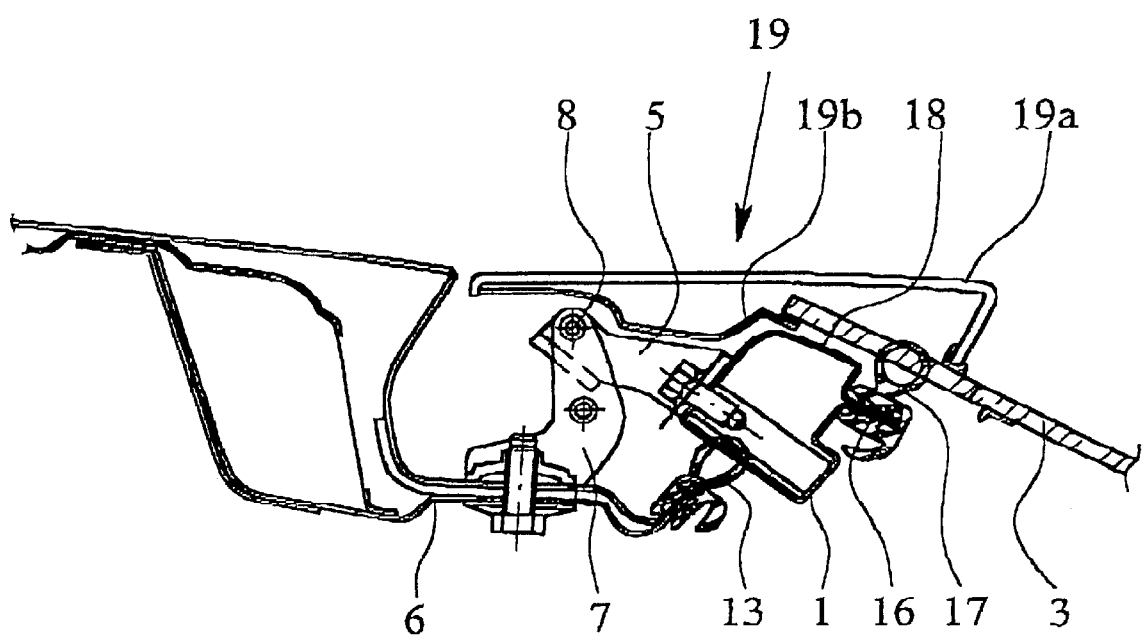
FIG. 5 shows the hinge area of a hatchback according to this invention having an openable windshield.
Figure 6:
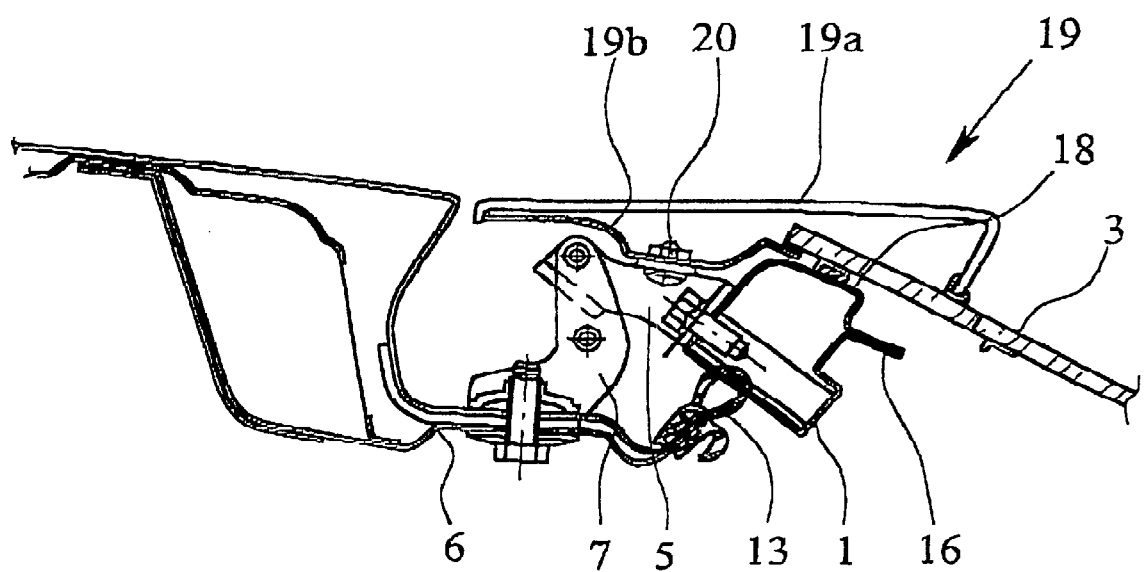
FIG. 6 shows the hinge area of a hatchback according to this invention having a stationary windshield.

FIG. 2 shows the hatchback finished with add-on parts together with the supporting frame 1, now seen from the inside. This shows a windshield 3 attached to the supporting frame 1 in the windshield area. In the embodiment illustrated here, this is a stationary windshield 3 which is glued onto the supporting frame 1. An outside door panel 4 attached in the wall area can be seen on the supporting frame 1. In the windshield area on the upper edge of supporting frame 1 are mounted hinge brackets 5 which are movable with supporting frame 1 and are connectable to stationary hinge blocks 7 (FIGS. 5 and 6) mounted on a stationary car body part 6 (FIGS. 4, 5 and 6). The stationary body part 6 is, for example, the roof frame of a corresponding body section on which the stationary hinge blocks 7 are mounted, in particular by screw connection, for hanging the hatchback.

The movable hinge brackets 5 of the hatchback are mounted on the stationary hinge blocks 7 of the body part 6 by means of a hinge element 8, which is in particular a hinge pin, which thus forms the corresponding pivot axis. A hinge element 8 is not to be understood as a certain number, and it is also quite possible for the concrete hinge design to have multiple hinge pins. It is also not necessary for hinge elements 8 to hinge brackets 5 and hinge blocks 7 to be separate parts. They may also be designed in one piece with the two elements involved.

FIG. 2 shows various additional modules of the hatchback, e.g., a windshield wiper unit 9 mounted on the connecting section 2. Furthermore, a cutout 10 can be seen in the outside door panel 4 for mounting a license plate module. Finally, a hatchback lock 11 can be seen on the lower edge of the supporting frame 1.

Figure 3:
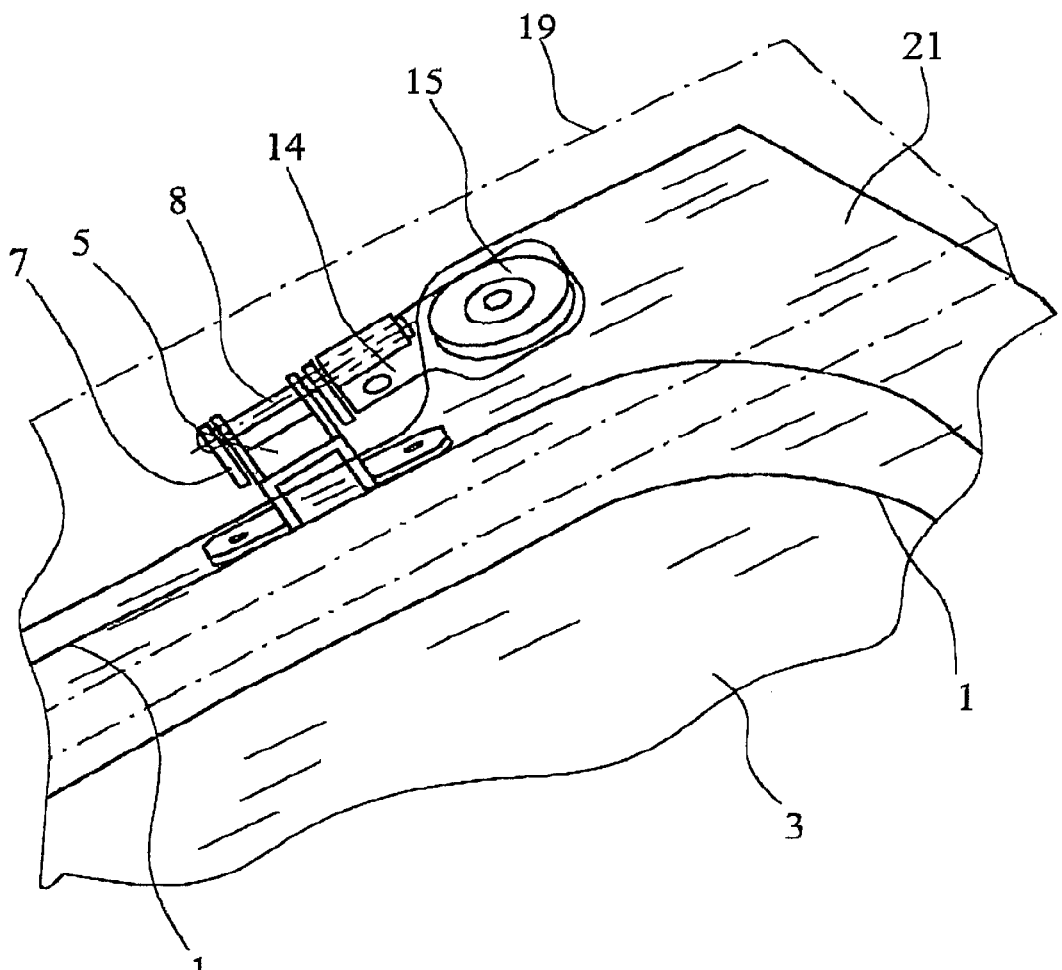
FIG. 3 shows the upper edge area of a hatchback according to this invention having a pivotably hinged windshield.

FIGS. 3, 4 and 5 belong together and show the upper corner area and sections of a hatchback according to this invention with the windshield 3 in turn being openable. On the other hand FIG. 6 shows a section corresponding to that in FIG. 5 with a hatchback having a stationary windshield 3.

First, it can be seen clearly here that the hinge brackets 5 are situated and designed so that in the design of the hatchback with the windshield 3 being itself openable, as indicated in FIGS. 3, 4 and 5, movable hinge parts 14 mounted on windshield 3 are also pivotably connectable by hinge elements 8 to the stationary hinge blocks 7. FIG. 3 shows the hinge pin forming hinge element 8 which projects laterally to the right beyond the stationary hinge block 7 and carries the movable hinge part 14 of windshield 3 there as the pivot axis. The movable hinge part 14 is in turn connected to the movable windshield 3 by a conventional large-area windshield support 15. FIG. 4 illustrates this typical screw connection of the windshield support 15 on the windshield 3.

The hollow metal section forming the supporting frame 1, designed here as a stretch-rolled hollow steel section produced by edge folding, has a fastening flange 16 in the windshield area for a windshield gasket 17 for the openable windshield 3. In addition, a contact surface for the above-mentioned hatchback gasket 13, which is mounted on a corresponding connecting flange on the stationary body part 6, can be seen on the inside of the supporting frame 1. Furthermore, the supporting frame 1 has an adhesive surface 18 for a stationary windshield 3 on the outside. The adhesive surface 18 is not used in the embodiment in FIG. 4, where the windshield gasket 17 is provided. In the embodiment in FIG. 6, the fastening flange 16 is not used and no windshield gasket 17 is present because it is not necessary with a stationary windshield 3. In this case the adhesive surface 18 on the supporting frame 1 is used. It is important that the supporting frame 1 can be used for a hatchback with a stationary windshield 3 in the same way as for a hatchback whose windshield 3 is itself openable. The supporting frame 1 is already prepared structurally for both variants.

FIGS. 3 through 6 illustrate the fact that the design is also such at another location, namely at the hinges, that the hatchback can fundamentally be used for both variants without any great changes. It is provided here that the hinge brackets 5 together with the mounting area for the respective hinge element 8 project upward above the upper edge of the supporting frame 1. It is thus particularly simple for the hinge parts 14 of the windshield 3, which is independently openable, to be also pivotably connected by the hinge element 8 to the stationary hinge blocks 7 without having to perform any particular structural measures. Such additional structural measures may otherwise consist of, for example, hinge brackets or the like, which encompass the supporting frame 1 in the form of an angle bend. None of that is necessary with the design presented here. The windshield 3 may project beyond the supporting frame 1 and may be sealed directly against the supporting frame 1, which is a great advantage for the overall construction.

It was already pointed out in the general part of the description that hinge brackets 5 which are mounted on supporting frame 1 in the upper lateral areas are known from the state of the art (DE 199 38 511 A1). This is expedient in particular when the supporting frame 1 is curved at the upper corners. This is also provided in the embodiment presented here, or it could be done otherwise with a stretch-bent hollow metal section as supporting frame 1. The free zones remaining in the upper corners can thus be used for the arrangement of the hinge brackets 5, hinge elements 8 and, in the case of the openable windshield 3, the movable hinge parts 14. Then the hinge brackets 5 need not project beyond the upper edge of the supporting frame 1, or at any rate they need not project as far as would otherwise be necessary.

However, the embodiment which is presented here and is preferred to this extent shows the hinge brackets 5 arranged so they are offset further toward the inside as is traditionally the case on the upper edge of supporting frame 1.

Use of a body part on the upper edge of the supporting frame 1 covering the transitional areas there is already known from the state of the art. This is a spoiler 19 which rests on windshield 3 on the upper edge and projects beyond the upper edge of the supporting frame 1 in the windshield area. Spoiler 19 consists of an angle-shaped outside part 19a, usually made of plastic, and on inside part 19b which is made of metal and is used for fastening the spoiler 19. This is at any rate the construction with the embodiment illustrated here.

FIG. 6 shows the mounting of spoiler 19 with a stationary windshield 3 such that spoiler 19 is mounted on the hinge brackets 5. The screw mounting 20 can be seen in FIG. 6.

FIGS. 4 and 5, however, illustrate the mounting of spoiler 19 with a windshield 3 that is itself openable. It can be seen here that the spoiler is not connected to the hinge brackets 5. This would not be expedient because spoiler 19 rests on windshield 3 and must be pivotable together with windshield 3 with respect to the supporting frame 1. Accordingly, it is provided, as shown in FIG. 4, that spoiler 19, namely its inside part 19b, is connected here to the movable hinge parts 14 of the movable windshield 3. To put it more precisely, the inside part 19b of the spoiler 19 is also mounted on the windshield support 15, which is in turn part of the movable hinge part 14.

It has already been pointed out that in the embodiment presented here and according to the preferred teaching, the supporting frame 1 is designed as a stretch-bent hollow metal section, in particular as a hollow metal section made of steel. This can be seen in the drawing from the way the projecting ends of the hollow metal section are joined on the mounting flange 16 where these projecting ends are welded together. Of course it is also possible for the hollow metal section to be manufactured as an extruded and stretch-bent section made of lightweight metal, in particular aluminum or an aluminum alloy or some other lightweight metal alloy.

The embodiment illustrated in FIG. 1 also shows a supporting frame which consists of an upper U-shaped section to form the windshield area and a lower U-shaped section to form the wall area, these two sections being welded together at their ends in a known manner. As a result, the supporting frame 1 is thus designed to run completely around the periphery. For other alternatives in this regard, reference is also made to the state of the art cited in the preamble (DE 199 38 511 A1).

The embodiment of a particularly preferred design of a hatchback according to this invention illustrated in FIG. 3 is also characterized in that the openable windshield 3 has corner areas 21 which project upward at the upper corners where the movable hinge parts 14 are mounted on windshield 3, here namely by means of the windshield supports 15 of the movable hinge parts 14. In the area between the corner areas 21, the openable windshield 3 is not raised as much. This is readily possible because this area of windshield 3 is covered by the spoiler 19, namely the outside part 19a of spoiler 19.

FIG. 2 shows another particular feature of this invention, consisting of the fact that an adapter part 22 which projects at the side is mounted on the supporting frame 1 in the wall area, in particular by welding or by screw mounting, forming a projecting edge for flanging the edge of the outside door panel 4. Thus a typical outside door panel 4 made of sheet metal may be mounted on the supporting frame 1 which is designed as a hollow metal section without any other particular features, especially with a traditional manufacturing technique. Moreover, adapter part 22 may also have additional mounting areas 23 as illustrated in the embodiment in FIG. 2 where other above-mentioned modules of the hatchback may expediently be mounted. This achieves a separation of functions between the supporting frame 1 and adapter part 22, resulting in an optimum design of the hatchback according to this invention.

This hatchback is characterized in that the hinge brackets 5 are arranged and/or designed so that movable hinge parts 14 mounted on the windshield 3, in the case of the design of the automobile hatchback having a windshield 3 which is itself openable, are also pivotably connectable by the hinge elements 8 to the stationary hinge blocks 7. It is especially expedient that the metal section forming the supporting frame 1 has a mounting flange 16 for a windshield gasket 17 for an openable windshield 3 in the area of the windshield, and on the outside it has an adhesive surface 18 for a stationary windshield 3. It is especially expedient that the hinge brackets 5 together with the mounting area for the respective hinge element 8 project upward above the upper edge of the supporting frame 1.

It is recognized that various equivalents, alternatives, and modifications are possible within the scope of the appended claims.

What is claimed is:

1. An automobile hatchback adapted for alternatively mounting a stationary windshield and a separately openable windshield thereon, the hatchback comprising:

a substantially peripheral metal profile supporting frame having a windshield area, a wall area, and a connecting section, the connecting section arranged transversely in the supporting frame at a transition between the windshield area and wall area;

an outside door panel coupled to the supporting frame in the wall area;

a mounting flange on the supporting frame in the windshield area for selectively receiving a windshield gasket, the windshield gasket for supporting the separately openable windshield; and a bonding surface on the supporting frame in the windshield area, the bonding surface for mounting the stationary windshield on the supporting frame; and at least one hinge bracket movably coupled to the supporting frame and projecting above an upper edge of the supporting frame in the windshield area, the at least one hinge bracket pivotably connectable by at least one hinge element to a stationary hinge block mounted on a stationary body part to pivotably couple the supporting frame to an automobile.

2. The automobile hatchback of claim 1 further comprising:

the separately openable windshield, the separately openable windshield having at least one corner area extending beyond the upper edge of the supporting frame, and at least one movable hinge part coupled to the separately openable windshield in the at least one corner area, the movable hinge part extending beyond the upper edge of the supporting frame and pivotably coupled to the stationary hinge block by hinge element, such that the separately openable windshield is pivotable relative to the supporting frame.

3. The automobile hatchback of claim 2 further comprising:

a spoiler coupled to the movable hinge part of the separately openable windshield, said spoiler projecting above the upper edge of the supporting frame.

4. The automobile hatchback of claim 1 further comprising:

the stationary windshield coupled to the bonding surface of the supporting frame.

5. The automobile hatchback of claim 4 further comprising:

a spoiler coupled to at least one hinge bracket of the stationary windshield, the spoiler projecting above the upper edge of the supporting frame.

6. The automobile hatchback of claim 2, wherein the corner area further comprises an upper corner, the upper corner projecting upwards relative to the separately openable windshield.

7. The automobile hatchback of claim 1, wherein the at least one hinge bracket is coupled to the supporting frame such that a mounting area for the at least one hinge element is disposed in a free space outside the supporting frame.

8. The automobile hatchback of claim 1, wherein the metal profile supporting frame is hollow.

9. The automobile hatchback of claim 8, wherein the windshield area of the supporting frame is formed by an upper U-shaped part and the wall area of the supporting frame is formed by a lower U-shaped part, the upper and lower U-shaped parts being welded together.

10. The automobile hatchback of claim 8, wherein the hollow metal profile supporting frame is stretch-bent.

11. The automobile hatchback of claim 10, wherein the stretch-bent hollow metal profile supporting frame is formed of lightweight metal.

12. The automobile hatchback of claim 10, wherein the stretch-bent hollow metal profile supporting frame is formed of steel.

13. The automobile hatchback of claim 4, wherein the stationary windshield is coupled to the bonding surface of the supporting frame by adhesive.

14. The automobile hatchback of claim 1, wherein the at least one hinge element is a hinge pin.

15. An automobile hatchback adapted for selectively mounting a stationary windshield and a separately openable windshield thereon, the hatchback comprising:

a substantially peripheral metal profile supporting frame having a windshield area and a wall area;

a mounting flange in the windshield area for receiving a windshield gasket such that the windshield gasket forms a seal with the operable windshield; and a bonding surface in the windshield area for selectively receiving an adhesive to secure the stationary windshield to the supporting frame.

16. The automobile hatchback of claim 15 further comprising:

at least one hinge bracket movably coupled to the supporting frame and projecting above an upper edge of the supporting frame in the windshield area, the at least one hinge bracket pivotably connectable by at least one hinge element to a stationary hinge block mounted on a stationary body part such that the supporting frame is pivotably coupled to an automobile.

17. The automobile hatchback of claim 16, further comprising:

the separately openable windshield coupled to the supporting frame in the windshield area, the separately openable windshield having at least one corner area extending beyond the upper edge of the supporting frame; and movable hinge parts coupled to the openable separately windshield, the movable hinge parts pivotably connectable by the at least one hinge element to the stationary hinge block on the stationary body part, such that the separately openable windshield is pivotable relative to the supporting frame.

18. The automobile hatchback of claim 17, further comprising:

a spoiler coupled to the movable hinge parts, the spoiler projecting above the upper edge of the supporting frame.

19. The automobile hatchback of claim 15, further comprising:

the stationary windshield coupled to the adhesive on the bonding surface of the supporting frame in the windshield area.

20. The automobile hatchback of claim 19, further comprising:

a spoiler coupled to the at least one hinge bracket and projecting above the upper edge of the supporting frame.

21. The automobile hatchback of claim 17, wherein the at least one hinge bracket is coupled to the supporting frame such that a mounting area for the at least one hinge element is disposed in a free space outside the supporting frame.

* * * * *